Dec. 13, 1938.  D. E. BRONSTEIN  2,139,875

GAME APPARATUS

Filed April 5, 1937

Inventor
D. E. Bronstein
by
J. Edw. Maybee
ATTY.

Patented Dec. 13, 1938

2,139,875

UNITED STATES PATENT OFFICE 2,139,875

GAME APPARATUS

David E. Bronstein, Toronto, Ontario, Canada, assignor to Score Corporation Limited, Winnipeg, Manitoba, Canada Application April 5, 1937, Serial No. 134,990

2 Claims. (Cl. 273—139)

The object in the present invention is to provide a game device which, while requiring the use of physical apparatus, is in essence a game requiring the exercise of mental ingenuity.

The fundamental idea is the setting of a puzzle, the solution of which discloses a specific symbol or symbols and gives directions for the performance of a manual operation which discloses concrete evidence that the right solution has been arrived at, which evidence may be used to indicate a win.

The idea may be carried out by means of a game board bearing a list of problems to be solved and a list of winning indicia. A part of the board is formed with a plurality of rows of recesses containing indicia-bearing members, the indicia of each row being arranged to form an answer to one of the problems postulated. The holes or recesses are normally closed by frangible means preventing access to the indicia bearing members.

The list of problems and the rows of recesses are correspondingly numbered.

One embodiment of my invention may be described as follows having reference to the accompanying drawing in which—

Figure 1:
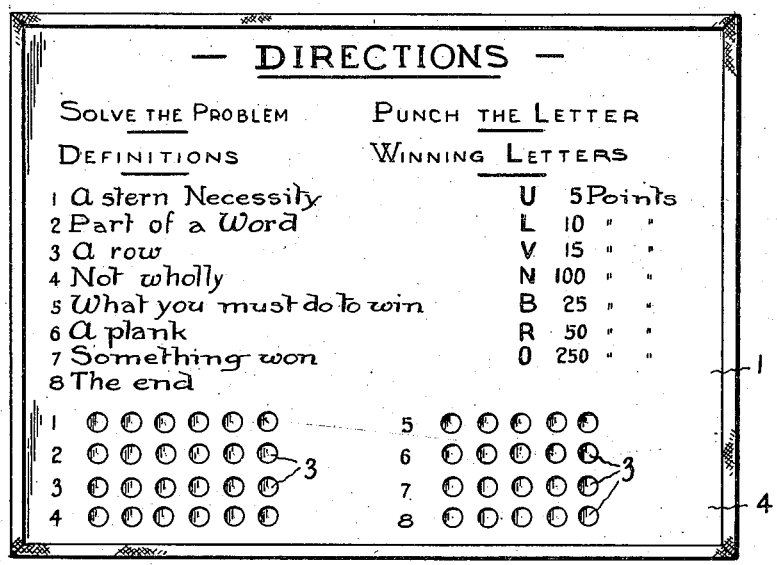
Figure 2:
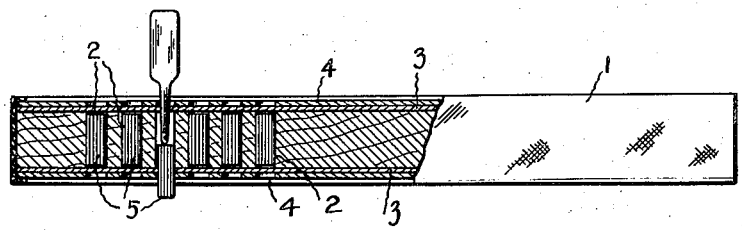
Figure 3:

Fig. 1 is a plan view of the apparatus;

Fig. 2 a partial section on an enlarged scale;

Fig. 3 a perspective detail of one of the slips bearing letters; and

Figure 4:
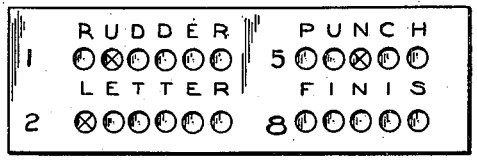

Fig. 4 a diagram illustrating the mode of use.

In the drawing like numerals of reference indicate corresponding parts in the different figures.

The physical apparatus is illustrated in Figs. 1–3.

A suitable board 1 is formed with columns of rows of holes 2. To each side of the board is applied a sheet 3 of puncturable material such as metal foil. Over the foil is applied at each side a sheet of cover material 4 formed with holes aligning with the holes 2. In each hole is positioned a fan-folded strip of paper 5 which is shown partly expanded in Fig. 3 but which may be compressed as shown in Fig. 2 to fit in a hole. The strips each bear a letter and the lettered strips are arranged to form words, which words are arranged in columns of rows in the holes.

On the face of the device appear directions for use and a list of prizes to be won by solving the problems postulated and correctly punching a word or winning letter.

The method of use is best understood on reference to Fig. 4. The directions include a series of problems, such, for instance, as postulated in crossword puzzles in which the answer to a definition is a word.

Directions are given opposite each definition indicating where the word answer is positioned in the columns of rows of holes and what particular letter in a word must be punched out to indicate a win.

The answer to the first problem is "rudder" found in row 1, column 1, of the holes. The player knows that the winning letter U referred to in the directions is the second letter of the word and he therefore punches the second hole in row 1, column 1, and pushes out a slip of paper bearing the letter U which then serves as concrete evidence that the problem has been solved and the player entitled to certain points or prizes. Usually it will only be allowable for a player to punch one hole in a row.

If the player has not worked out the right solution he will fail to obtain one of the letters designated and can only succeed by trying again with a row not previously punched.

It must be understood that the words such as "rudder" and "punch" appearing on Fig. 4 of the drawing do not appear on the device as used, but are used merely to indicate the words that are formed by the lettered strips hidden in the holes.

It will be understood that other forms of problem than that shown may be used to point to different letters or sylmbols or combinations of letters and symbols which must be found in the holes of the board to make the player a winner.

So also the directions for use may be on a part separate from the board containing the recesses and may be used as a cover therefor.

In practice' problems will be set which have only one answer and thus eliminate as far as possible the element of chance.

What I claim as my invention is:

1. Game apparatus comprising a game board bearing a list of problems to be solved and a list of winning indicia and formed with a plurality of rows of recesses; a plurality of rows of indicia-bearing members contained in said recesses, the indicia of each row being arranged to form an answer to one of the problems postulated and one or more of the indicia-bearing members of various rows of recesses bearing indicia corresponding to those of the list of winning indicia aforesaid; and frangible closing means for the recesses normally preventing access to the indicia bearing members, the list of problems and the rows of recesses containing the indicia-bearing members being correspondingly numbered.

2. Game apparatus according to claim 1 in which the indicia of the bearing members form a series of words and the list of problems is a series of words suggesting or defining the words which form the answers and the winning indicia are letters found in the word answers.

DAVID E. BRONSTEIN.